United States Patent [19]

Rice

[11] Patent Number: 5,127,257

[45] Date of Patent: Jul. 7, 1992

[54] AIR GUN SOLENOID TESTER

[75] Inventor: Gary C. Rice, Orchard, Tex.

[73] Assignee: Texaco Inc., White Plains, N.Y.

[21] Appl. No.: 563,027

[22] Filed: Aug. 6, 1990

[51] Int. Cl.⁵ .............................................. G01M 19/00
[52] U.S. Cl. ........................................ 73/11; 73/865.9
[58] Field of Search ................ 73/865.9, 11, 168, 4 R; 124/77

[56] References Cited

U.S. PATENT DOCUMENTS

| 4,349,200 | 9/1982 | Wakefield | 73/12 X |
| 4,615,722 | 10/1986 | Steffan et al. | 75/4 R X |
| 4,960,183 | 10/1990 | Young | 181/107 |

FOREIGN PATENT DOCUMENTS

| 12155 | 1/1985 | Japan . | |
| 94238 | 4/1989 | Japan . | |
| 711241 | 1/1980 | U.S.S.R. | 73/11 |
| 714208 | 2/1980 | U.S.S.R. | 73/11 |

Primary Examiner—Tom Noland

[57] ABSTRACT

The present invention is an air gun solenoid tester which includes a test fixture that holds the air gun solenoid in such a manner that air can be supplied to the air gun solenoid being tested through the test fixture and air can exit from the air gun solenoid through the test fixture. A source provides air to the test fixture in response to a fire pulse which is provided by a fire pulse circuit. The fire pulse circuit also provides the fire pulse to the air gun solenoid. A network connected to the air gun solenoid and to the fire pulse circuit evaluates the air gun solenoid under test in accordance with the fire pulse and an electrical response from the air gun solenoid.

17 Claims, 2 Drawing Sheets

AIR GUN SOLENOID TESTER

BACKGROUND OF THE INVENTION

Field of the Invention

The present invention relates to test equipment in general and, more particularly, test equipment for testing components of an air gun.

SUMMARY OF THE INVENTION

The present invention is an air gun solenoid tester which includes a test fixture that holds the air gun solenoid in such a manner that air can be supplied to the air gun solenoid being tested through the test fixture and air can exit from the air gun solenoid through the test fixture. A source provides air to the test fixture in response to a fire pulse which is provided by a fire pulse circuit. The fire pulse circuit also provides the fire pulse to the air gun solenoid. A network connected to the air gun solenoid and to the fire pulse circuit evaluates the air gun solenoid under test in accordance with the fire pulse and an electrical response from the air gun solenoid.

The objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustrative purposes only and are not to be construed as defining the limits of the invention.

DESCRIPTION OF THE INVENTION

Figure 1:
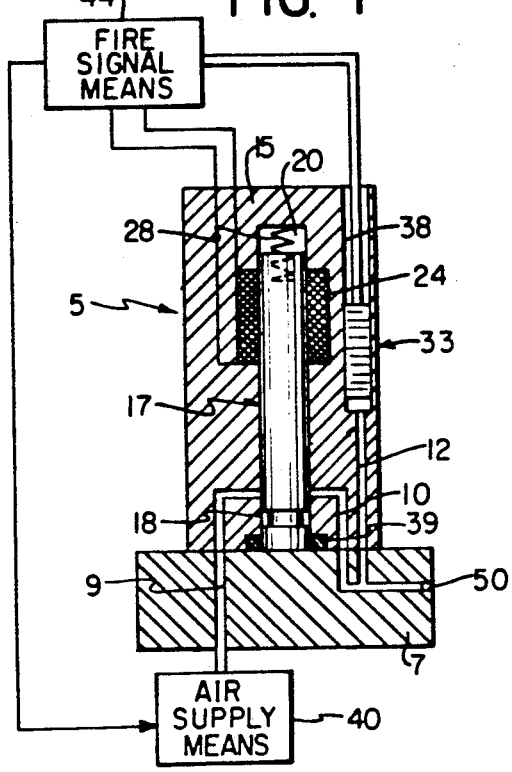
FIG. 1 is a partial simplified block diagram and a partial schematic of an air gun solenoid tester constructed in accordance with the present invention.

With reference to FIG. 1, there is shown an air gun solenoid 5 mounted on a test fixture 7 in which there are connecting passageways 9, 10 and 12 between the test fixture 7 and the air gun solenoid 5. Air gun solenoid 5 which is of the conventional type, has a body 15 having a plunger 17 located in a cavity 20. As shown in FIG. 1, air gun solenoid 5 is in an unenergized state. Plunger 17 is enwrapped with a solenoid coil 24 which in normal operation will be connected to a firing mechanism aboard a boat. In cavity 20 is a return spring 28 which is located between plunger 17 and an end wall of cavity 20. As noted earlier, air channels 9, 10 and 12 not only pass through test fixture 7, but also enter into body 15 of air gun solenoid 5. Thus, channels 9 and 10 communicate with cavity 20 while channel 12 is in communication with another cavity containing a pressure transducer 33. Pressure transducer 33 has electrical wires connected thereto which exit body 15 to an exit channel 38. An 'O' ring 39 prevents air in lines 9 and 10 from entering cavity 20 which would affect the operation of air gun solenoid 5.

Channel 9 in test fixture 7 is connected to an air supply means 40, that provides air at 150 psi, and which in turn is connected to a fire signal means 44.

Figure 3:
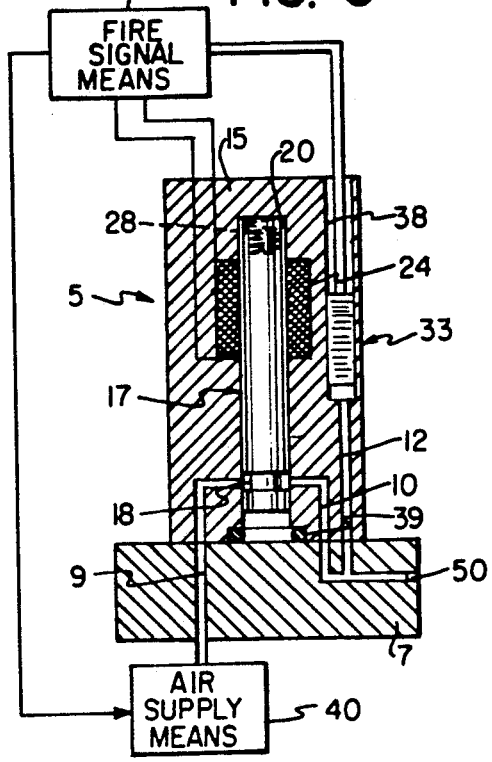
FIG. 3 is a simplified block diagram and a partial schematic showing the air gun solenoid being tested in a particular state.
Figure 2:
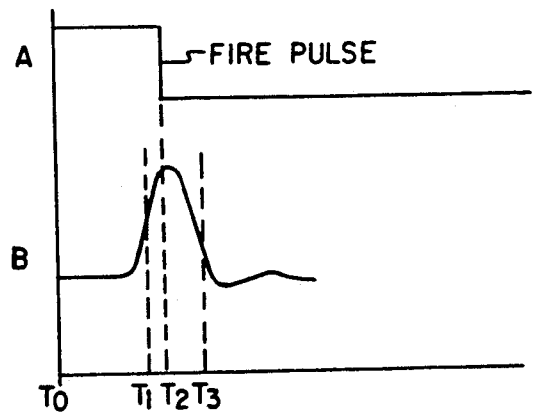
FIG. 2 is a graphical representation of waveforms that occurred during the operation of the present invention.

Referring also to FIG. 2, waveform A represents a fire pulse that is applied by fire signal means 44 at $t=t_0$ to solenoid coil 24, causing plunger 17 to drive against return spring 28. Once the fire pulse is removed from coil 24, the return spring 28 will cause plunger 17 to return to a rest state. All of this can be seen in FIG. 3, which shows air gun solenoid 5 in a dynamic state. Also, when in this state, the air pressure entering channel 9 will pass through groove 18, around plunger 17, and exits through channel 10 and orifice 50. As the air pressure initially builds up through the passage of channels 9 and 10, it also enters channel 12, thereby affecting pressure transducer 33, causing it during the operation to produce a signal shown in FIG. 2 as waveform B.

Figure 4:
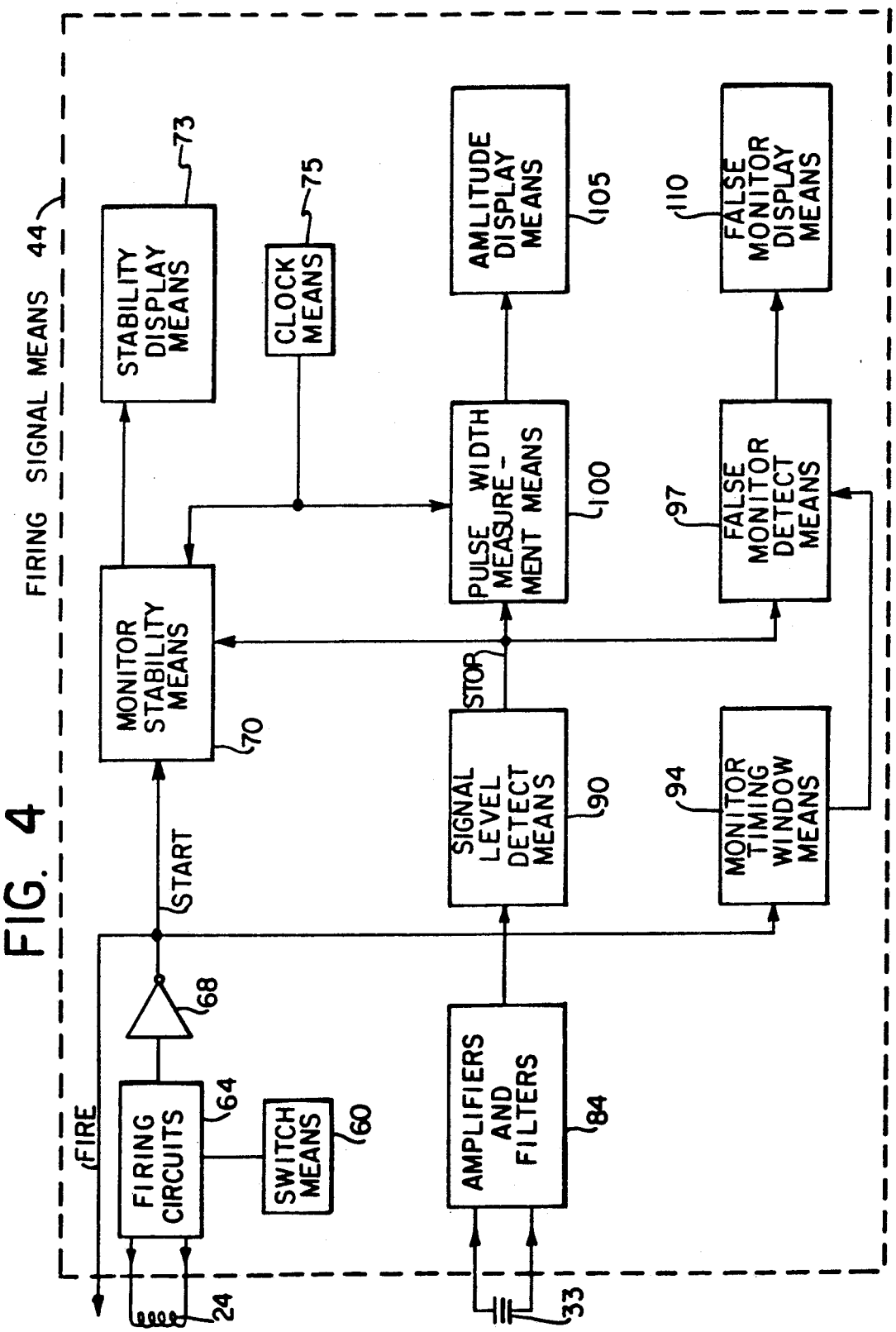
FIG. 4 is a detailed block diagram of the firing signal means shown in FIG. 1.

False monitor detector 97 in FIG. 4, will detect another waveform B that often results when there is an "O" ring 39 that is defective in the plunger assembly. If "O" ring 39 is defective, air pressure can get under the plunger and drive it to the return spring 28. When this happens with the solenoid attached to an air gun, auto fire of the air gun takes place and will cause the air gun to fire continuously in an uncontrolled state.

As can be seen in FIG. 2, the fire pulse starts at $t=t_0$. After a time delay, the air pressure sensed by sensor 33 starts to increase a $t=T_1$. At $t=T_2$, the fire pulse is terminated, at which time the signal from sensor 33 peaks. As the air escapes from air gun solenoid 5, the pressure sensed by sensor 33 decreases to just about ambient pressure at $t=T_3$.

Referring also to FIG. 4, the operation can be seen in more detail in which fire signal means 44 includes a manually operative switch means 60 connected to firing circuits 64. In response to operation of switch means 60, firing circuit 64 provides a fire pulse, shown in FIG. 2A, to solenoid coil 24. At the same time, firing circuits 64 provide a fire pulse to an inverter 68 which inverts the fire pulse and applied the inverted fire pulse as a start pulse to a monitor stability counter 70. Monitor stability counter 70 provides an output to the stability display means 73 which provides a display corresponding to the count. Clock means 75 provides timing pulses to counter 70. In essence, monitor stability means 70 and stability means 73 are monitoring plunger 17; that plunger 17 is not hanging up or has shifted. An unstable plunger 17 can cause false firing of an air gun.

Transducer 33 provides an electrical signal, as hereinbefore mentioned, to amplifiers and filter means 84. Amplifiers and filter means 84 cleans up and amplifies the signal. Means 84 provides the amplified signal to a signal level detector 90. Signal level detector 90 provides a stop pulse, which is used to stop the counting by stability counter 70, when the signal from amplifiers and filters means 84 reaches a predetermined level.

The start pulse from inverter 68 is also applied to a timing window means 94 which provides a pulse to a false monitor detector means 97 at a predetermined time after receiving a start pulse from inverter 68. False monitor detector means 97 also receives the stop pulse from signal level detector means 90 and provides an output to a monitor display means 110, in which, if the number is zero, the air gun being tested has failed to test. If number displayed is one, the air gun has passed the test and if the number is greater than one, it is a false air gun or auto fire (more than 1 pulse in the allotted time).

Clock means 75 also provides clock pulses to a pulse width measurement means 100 which also receives the stop pulse from signal level detector means 90. Pulse width measurement means 100 provides a signal to a pulse width display means 105 corresponding to the width of the firing pulse. If the signal from sensor 33 is weak, this would indicate that a potential water leakage problem or that crystal in sensor 33 was deteriorated.

Pulse width means 105 displays a numbered value that is proportional to the pulse width of the return signal (waveform B). What is expected is a nice narrow return pulse. When display means 105 displays a value that differs from the normal value it signifies a potential problem with the air gun solenoid under test.

What is claimed is:

1. An air gun solenoid tester:
   a test fixture means for holding an air gun solenoid having a plunger and, a pressure sensor in a manner so that air can be supplied to the air gun solenoid being tested through the test fixture and air can exit from the air gun solenoid through the test fixture,
   air supply means for supplying air to the test fixture in response to a fire pulse,
   fire pulse means for providing the fire pulse to the air supply means and to the air gun solenoid, and
   means electrically connected to the pressure sensor in the air gun solenoid and to the fire pulse means for evaluating the air gun solenoid under test in accordance with the fire pulse and a signal from the pressure sensor in the air gun solenoid.

2. A tester as described in claim 1 in which the evaluating means includes:
   false monitoring means for detecting a defective air gun solenoid that would cause uncontrolled, continuous firing of the air gun.

3. A tester as described in claim 2 in which the false monitoring means includes:
   signal level detect means connected to the pressure sensor for detecting when a signal from the pressure sensor passes a predetermined amplitude and provides a 'stop' pulse while the pressure sensor's signal exceeds the predetermined amplitude,
   monitor timing window means for providing a pulse output at the end of a predetermined time from receiving a 'start' pulse, and
   false monitor detect means for detecting whether no 'stop' pulse has been detected, a 'stop' pulse has been detected, or more than one 'stop' pulse has been detected.

4. A tester as described in claim 3 in which the evaluating means includes:
   means for determining the stability of the plunger in the air gun solenoid.

5. A tester as described in claim 4 in which the stability monitoring means includes:
   monitor stability means connected to the fire pulse means and to the signal level detect means for determining the stability of the plunger in the air gun solenoid in accordance with the 'stop' and 'start' pulses.

6. A tester as described in claim 5 in which the signal level detect means includes:
   an amplifier and filter circuit connected to the pressure sensor which amplifies and filters the signal from the pressure sensor and provides a filtered amplified signal, and
   amplitude detect means connected to the amplifier and filter circuit for providing the 'stop' pulse in accordance with the filtered amplified signal.

7. A tester as described in claim 6 in which the evaluating means includes:
   means for determining the strength of the signal provided by the pressure sensor.

8. A tester as described in claim 2 in which the evaluating means further includes:
   means for determining the stability of the plunger in the air gun solenoid.

9. A tester as described in claim 8 in which the stability monitoring means includes:
   signal level detect means connected to the pressure sensor for detecting when a signal from the pressure sensor passes a predetermined amplitude and provides a 'stop' pulse while the pressure sensor's signal exceeds the predetermined amplitude,
   monitor stability means connected to the fire pulse means and to the signal level detect means for determining the stability of the plunger in the air gun solenoid in accordance with the 'stop' and 'start' pulses.

10. A tester as described in claim 2 in which the false monitoring means includes:
    monitor timing window means connected to the fire pulse means for providing a pulse output at the end of a predetermined time interval starting with receiving a 'start' pulse, and
    false monitor detect means for detecting whether no 'stop' pulse has been detected, a 'stop' pulse has been detected, or more than one 'stop' pulse has been detected.

11. A tester as described in claim 10 in which the evaluating means includes:
    means for determining the strength of a signal provided by the pressure sensor.

12. A tester as described in claim 10 in which the pressure signal test means includes:
    means connected to the signal level detect means for providing a pulse width measurement which is representative of the strength of the signal provided by the pressure sensor.

13. A tester as described in claim 1 in which the evaluating means includes:
    means for determining the stability of the plunger in the air gun solenoid.

14. A tester as described in claim 13 in which the stability monitoring means includes:
    signal level detect means connected to the pressure sensor for detecting when a signal from the pressure sensor passes a predetermined amplitude and provides a 'stop' pulse while the pressure sensor's signal exceeds the predetermined amplitude, and
    monitor stability means connected to the fire pulse means and to the signal level detect means for determining the stability of the plunger in the air gun solenoid in accordance with the 'stop' and 'start' pulses.

15. A tester as described in claim 14 in which the signal level detect means includes:
    an amplifier and filter circuit connected to the pressure sensor which amplifies and filters the signal from the pressure sensor and provides a filtered amplified signal, and
    amplitude detect means connected to the amplifier and filter circuit for providing the 'stop' pulse in accordance with the filtered amplified signal.

16. A tester as described in claim 1 in which the evaluating means includes:
   means for determining the strength of the signal provided by the pressure sensor.

17. A tester as described in claim 16 in which the pressure signal test means includes:
   an amplifier and filter circuit connected to the pressure sensor which amplifies and filters the signal from the pressure sensor to provide a filtered amplified signal, signal level detect means connected to the amplifier and filter circuit for detecting the level of the amplified filtered signal and providing a stop pulse while the filtered amplified signal has exceeded a predetermined amplitude, and means connected to the signal level detect means for providing a pulse width measurement which is representative of the strength of the pressure sensor's signal.

* * * * *